United States Patent
Bhattacharyya et al.

(10) Patent No.: US 12,438,927 B2
(45) Date of Patent: Oct. 7, 2025

(54) METHOD AND SYSTEM FOR MANAGING TELEROBOTIC SESSION IN AN ENTERPRISE NETWORK

(71) Applicant: Tata Consultancy Services Limited, Mumbai (IN)

(72) Inventors: Abhijan Bhattacharyya, Kolkata (IN); Ashis Sau, Kolkata (IN); Madhurima Ganguly, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 18/421,235

(22) Filed: Jan. 24, 2024

(65) Prior Publication Data

US 2025/0240333 A1 Jul. 24, 2025

(51) Int. Cl.
*G06F 13/00* (2006.01)
*B25J 9/16* (2006.01)
(Continued)

(52) U.S. Cl.
CPC ........ *H04L 65/1069* (2013.01); *B25J 9/1689* (2013.01); *H04L 51/046* (2013.01); *H04L 65/1045* (2022.05); *H04L 65/80* (2013.01)

(58) Field of Classification Search
CPC ..... H04L 67/104; H04L 67/10; H04L 67/288; H04L 65/1069; H04L 51/046; H04L 65/1045; H04L 65/80; B25J 9/1689
(Continued)

(56) References Cited

U.S. PATENT DOCUMENTS

| | | | |
|---|---|---|---|
| 9,451,383 B2 * | 9/2016 | Bulut | H04W 4/60 |
| 2013/0103844 A1 * | 4/2013 | Bulut | H04L 67/145 |
| | | | 709/228 |

(Continued)

FOREIGN PATENT DOCUMENTS

| | | | | |
|---|---|---|---|---|
| CN | 115396479 A | * | 11/2022 | |
| EP | 4407953 A1 | * | 7/2024 | ........... H04L 67/125 |
| WO | WO-2018160267 A2 | * | 9/2018 | .............. B25J 9/161 |

OTHER PUBLICATIONS

Botta et al., "Cloud, Fog, and Dew Robotics: architectures for next generation applications," 7th IEEE International Conference on Mobile Cloud Computing, Services, and Engineering (MobileCloud) (2019).

(Continued)

*Primary Examiner* — Kenneth R Coulter
(74) *Attorney, Agent, or Firm* — Finnegan, Henderson, Farabow, Garrett & Dunner, LLP

(57) ABSTRACT

Telerobotic systems that are available currently for enterprise uses are mostly cloud centric systems i.e., they require Internet connection for functioning. Too much cloud-centricity not only increases overall latency in getting decision outcome, but also adds a certain probability of uncertainty in performance and availability of the cloud-service due to unreliability in the public Internet backhaul. Present disclosure provides method and system for managing telerobotic session in enterprise network. The system first identifies dew signaling server for communication wherein a telerobotic device present in enterprise network offer to act as dew signaling server. The system then establishes a peer-to-peer (P2P) connection between dew signaling server and a cloud signaling server present in a public cloud for instantiating the dew signaling server. Thereafter, when system receives the enterprise level signaling requests from enterprise user (Continued)

devices, the system redirects enterprise level signaling requests to dew signaling server using enterprise network proxy.

12 Claims, 4 Drawing Sheets

(51) Int. Cl.
   *H04L 51/046* (2022.01)
   *H04L 65/1045* (2022.01)
   *H04L 65/1069* (2022.01)
   *H04L 65/80* (2022.01)
(58) Field of Classification Search
   USPC .................. 709/201, 250, 202, 203, 206
   See application file for complete search history.

(56) References Cited

U.S. PATENT DOCUMENTS

2024/0223394 A1* 7/2024 Bhattacharyya .... H04L 65/4038
2024/0244092 A1* 7/2024 Bhattacharyya .... H04L 65/1069

OTHER PUBLICATIONS

Botta et al., "Networking for Cloud Robotics: The DewROS Platform and Its Application," J Sens Actuator Netw., 10(34) (2021).
Gusev, "A Dew Computing Solution for IoT Streaming Devices," MIPRO (2017).

* cited by examiner

METHOD AND SYSTEM FOR MANAGING TELEROBOTIC SESSION IN AN ENTERPRISE NETWORK

PRIORITY CLAIM

This U.S. patent application claims priority under 35 U.S.C. § 119 to: Indian Patent Application number 202321003050, filed on Jan. 26, 2023. The entire contents of the aforementioned application are incorporated herein by reference.

TECHNICAL FIELD

The disclosure herein generally relates to telerobotic application, and, more particularly, to a method and a system for managing telerobotic session in an enterprise network using dew computing technique.

BACKGROUND

Telerobotics is basically a semi-automatic robotic system that involves a human operator/observer in-loop for maneuvering a robot remotely over the Internet. The telerobotics technique is available for quite some time now. But demand and utility for the telerobotics is greatly felt during situations like pandemic, war, etc. when the civilization struggled to meet the diverging requirements of continuing 'social' cooperation in one hand, while maintaining physical 'distancing' on the other. Currently, telerobotic application is seen as an important factor to augment human endeavors in future especially in enterprises.

However, telerobotic systems that are available currently for enterprise uses are mostly cloud centric systems i.e., they require Internet connection for functioning. So, this prevalent dependence on the cloud centric architecture reduces the practical applications of the telerobotic systems in enterprises as too much cloud-centricity not only increases the overall latency in getting the decision outcome, but also adds a certain probability of uncertainty in performance and availability of the cloud-service due to the unreliability in the public Internet backhaul. Further, in the telerobotics systems, the operator to robot connection works on a 'logical' peer-to-peer (P2P) topology which further limits the number of users who can remotely join a telerobotic session, thereby making them unusable in situations in which more than one human user is required to connect simultaneously in the telerobotic session to collaboratively perform a combination of tasks remotely through the robot.

Further, to mitigate the latency, some systems use an additional edge close to the robot/operator premise as it can significantly lower the latency. However, such edge-based systems increase the capital expenditure for the enterprises. Further, the addition of edge adds to the operating expenditure as the edge infrastructure needs maintenance and management.

SUMMARY

Embodiments of the present disclosure present technological improvements as solutions to one or more of the above-mentioned technical problems recognized by the inventors in conventional systems. For example, in one aspect, there is provided a system for managing telerobotic session in an enterprise network. The system comprises a public cloud server communicatively coupled to an enterprise network, the public cloud server comprising a cloud signaling server; and a telerobotic device communicatively coupled to the public cloud server via the enterprise network, wherein the telerobotic device comprises a first memory configured to store a first set of instructions; and a first set of hardware processors coupled to the first memory via a first set of communication interfaces, wherein the first set of hardware processors is configured by the first set of instructions to: establish a peer-to-peer connection (P2P) between a dew signaling server and the cloud signaling server, wherein the P2P connection is established based on a connection request received by the public cloud server from the telerobotic device offering to act as the dew signaling server; receive one or more enterprise level signaling requests from one or more enterprise user devices associated with one or more enterprise users via an enterprise network proxy; redirect the one or more enterprise level signaling requests to the dew signaling server present on the telerobotic device using the enterprise network proxy; perform a signaling negotiation between the dew signaling server and the one or more enterprise user devices to establish a session between the dew signaling server and each enterprise user device of the one or more enterprise user devices; and enable the telerobotic device to handle one or more requests received from each enterprise user device of the one or more enterprise user devices based on the established session In another aspect, there is provided a processor implemented method for managing telerobotic session in an enterprise network. The method comprises establishing a peer-to-peer connection (P2P) between a dew signaling server and a cloud signaling server, wherein the cloud signaling server is present in a public cloud server; and wherein the P2P connection is established based on a connection request received by the public cloud server from the telerobotic device offering to act as the dew signaling server; receiving one or more enterprise level signaling requests from one or more enterprise user devices associated with one or more enterprise users via an enterprise network proxy; redirecting the one or more enterprise level signaling requests to the dew signaling server present on the telerobotic device using the enterprise network proxy; performing a signaling negotiation between the dew signaling server and the one or more enterprise user devices to establish a session between the dew signaling server and each enterprise user device of the one or more enterprise user devices; and enabling the telerobotic device to handle one or more requests received from each enterprise user device of the one or more enterprise user devices based on the established session.

In yet another aspect, there are provided one or more non-transitory machine-readable information storage mediums comprising one or more sets of instructions which when executed by one or more sets of hardware processors cause a method for managing telerobotic session in an enterprise network. The method comprises establishing a peer-to-peer connection (P2P) between a dew signaling server and a cloud signaling server, wherein the cloud signaling server is present in a public cloud server; and wherein the P2P connection is established based on a connection request received by the public cloud server from the telerobotic device offering to act as the dew signaling server; receiving one or more enterprise level signaling requests from one or more enterprise user devices associated with one or more enterprise users via an enterprise network proxy; redirecting the one or more enterprise level signaling requests to the dew signaling server present on the telerobotic device using the enterprise network proxy; performing a signaling negotiation between the dew signaling server and the one or more enterprise user devices to establish a session between the dew signaling server and each enterprise user device of the one or more enterprise user devices; and enabling the telerobotic device to handle one or more requests received from each enterprise user device of the one or more enterprise user devices based on the established session.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
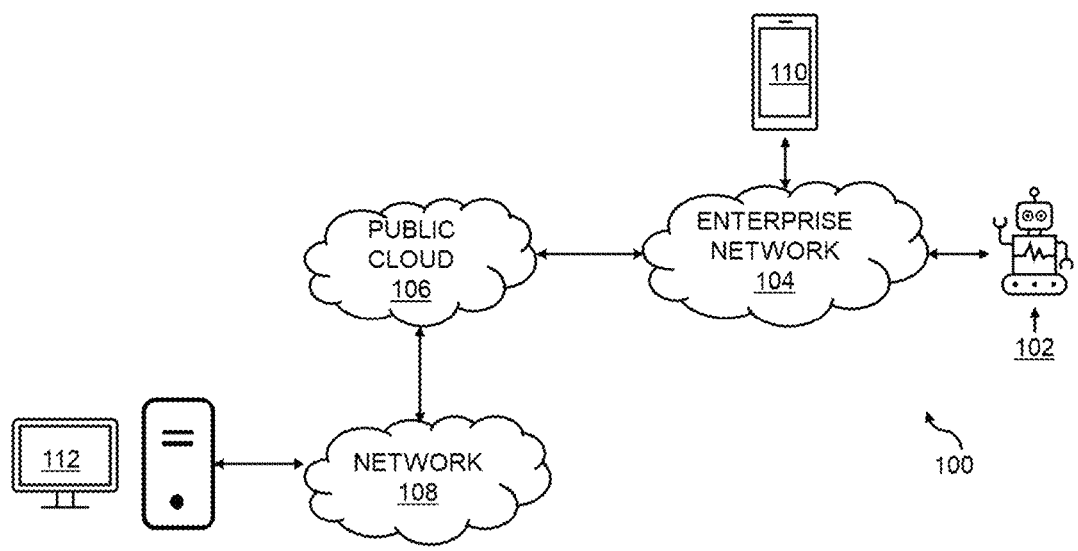
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Telerobotics, as suggested by the prefix 'Tele', is a semi-automatic robotic system that has a human in-loop either as an operator or as an observer. The telerobotics systems can be broadly classified into a telepresence system and a teleoperation system. A telepresence robot of the telepresence system is basically a remote-operated, wheeled device that includes a video conferencing gadget which can be driven around from remote locations. An operator using his/her computer or personal digital assistant (PDA) can drive the telepresence robot at a remote location, see things and speak out to people through the camera and audio devices installed on the telepresence robot. Thus, the telepresence robot acts like a physical avatar of the remote operator. Similarly, if the telepresence robot is equipped with actuators (along with the wheel system to move around) and the operator can actuate remotely in real-time through the telepresence robot, then such systems are termed as teleoperation systems.

As discussed earlier, the inception of global pandemic has underscored and reinforced the utility and necessity of the telerobotic applications as an important factor to augment human endeavors in future in terms of enterprises. However, the currently available telerobotic systems for enterprises are not able to provide the solutions for few of the problems discussed below.

Latency: The commands from the operator depend on the visual feedback from the robot, so there should be extremely low delay in the end-to-end communication path between the robot and the operator for improving the overall Quality of Experience (QoE) for the end users.

Computing, storage capacity and energy constraint: As it is known that the robots are mobile devices with limited computing and storage capacity and form factor of the computing unit impacts the structure and balance of the robot, thus too large computing unit is not recommended. Also, too heavy computing drains energy from the robot battery.

Democratization of user interface at the operator end: The end user should ideally be able to maneuver the robot through any electronic device without requiring heavy software installation/hardware augmentation. Otherwise, the telerobotic application cannot be democratized.

Additionally, the available techniques are either cloud-centric in which the cloud maintains the session with the robot for end users which sometimes cause increased latency due to internet uncertainty while significantly reducing desired quality of service, or edge-based systems in which an additional edge is added close to the robot/operator premise which increases the operation as well as the maintenance cost for the enterprises.

So, a technique that can efficiently manage telerobotic session in an enterprise network while ensuring performance guarantee and reducing latency and session establishment overhead at the system-level is still to be explored.

Embodiments of the present disclosure overcome the above-mentioned disadvantages by providing a system and a method for managing a telerobotic session in an enterprise network using dew computing. The system of the present disclosure first identifies a dew signaling server for communication wherein a telerobotic device present in the enterprise network offer to act as the dew signaling server. The system then establishes a peer-to-peer (P2P) connection between the dew signaling server and a cloud signaling server present in a public cloud. Thereafter, when the system receives the enterprise level signaling requests from one or more enterprise user devices associated with one or more enterprise users, the system redirects the one or more enterprise level signaling requests to the dew signaling server present on the telerobotic device using an enterprise network proxy. Further, the system performs a signaling negotiation between the dew signaling server and the one or more enterprise user devices to establish a session between the dew signaling server and each enterprise user device of the one or more enterprise user devices. The established session enables the telerobotic device to handle requests received from enterprise user devices and the requests received from non-enterprise user devices are processed by the cloud signaling server.

In the present disclosure, the system and the method use the dew signaling server present in the telerobotic device for handling requests received from enterprise user devices, thereby ensuring improved quality of experience for enterprise users as session establishment is very quick between the dew signaling server and the enterprise user devices. Further, when the session is limited only to enterprise users, the system does not consume bandwidth from the public Internet infrastructure as the requests are handled by the due signaling server residing in the telerobotic device, thereby ensuring reduces bandwidth consumption even when the signaling server resides in the cloud.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, establishment of peer-to-peer (P2P) connection, performing signaling negotiations, etc. The environment 100 generally includes a telerobotic device, such as a telerobotic device 102, and a public cloud 106, each in communication with an enterprise network 104. The public cloud 106 is also in communication with a network 108. The environment 100 also includes an enterprise user device 110 connected with the enterprise network 104, and a non-enterprise user device 112 connected to the network 108. It should be noted that one enterprise user device and one non-enterprise user device is shown for the sake of explanation; there can be more numbers of enterprise and non-enterprise user devices.

In an embodiment, the enterprise network 104 refers to a network that is created to fulfill network needs, such as data exchange, and running business processes of a large organization.

In an embodiment, the public cloud 106 is a shared platform to deliver computing services, such as applications, virtual machines, storage etc. by third party service providers through the Internet. Examples of the public cloud include, but are not limited to, Amazon elastic compute cloud (EC2), Microsoft™ Azure, IBM's™ blue cloud, sun cloud, and Google™ cloud.

The enterprise network 104 and the network 108 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the enterprise network 104 and the network 108 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The enterprise user device 110 is associated with an enterprise user (e.g., an employee working for an entity such as an organization) who wants to establish a telerobotic session for handling the telerobotic device 102. The non-enterprise user device 112 is associated with a non-enterprise user (e.g., external stakeholders, such as clients, vendors, certification authorities, etc.) who wants to join the telerobotic session from outside the enterprise network.

Examples of the enterprise user device 110 and the non-enterprise user device 112 include, but are not limited to, a personal computer (PC), a mobile phone, a tablet device, a Personal Digital Assistant (PDA), a server, a voice activated assistant, a smartphone, and a laptop.

The number and arrangement of clouds, devices, and/or networks shown in FIG. 1 are provided as an example. There may be additional clouds, devices, and/or networks; fewer clouds, devices, and/or networks; different clouds, devices, and/or networks; and/or differently arranged clouds, devices, and/or networks than those shown in FIG. 1. Furthermore, two or more devices shown in FIG. 1 may be implemented within a single device, or a single device shown in FIG. 1 may be implemented as multiple, distributed systems or devices. Additionally, or alternatively, a set of devices (e.g., one or more devices) of the environment 100 may perform one or more functions described as being performed by another set of systems or another set of devices of the environment 100 (e.g., refer scenarios described above).

Figure 2:
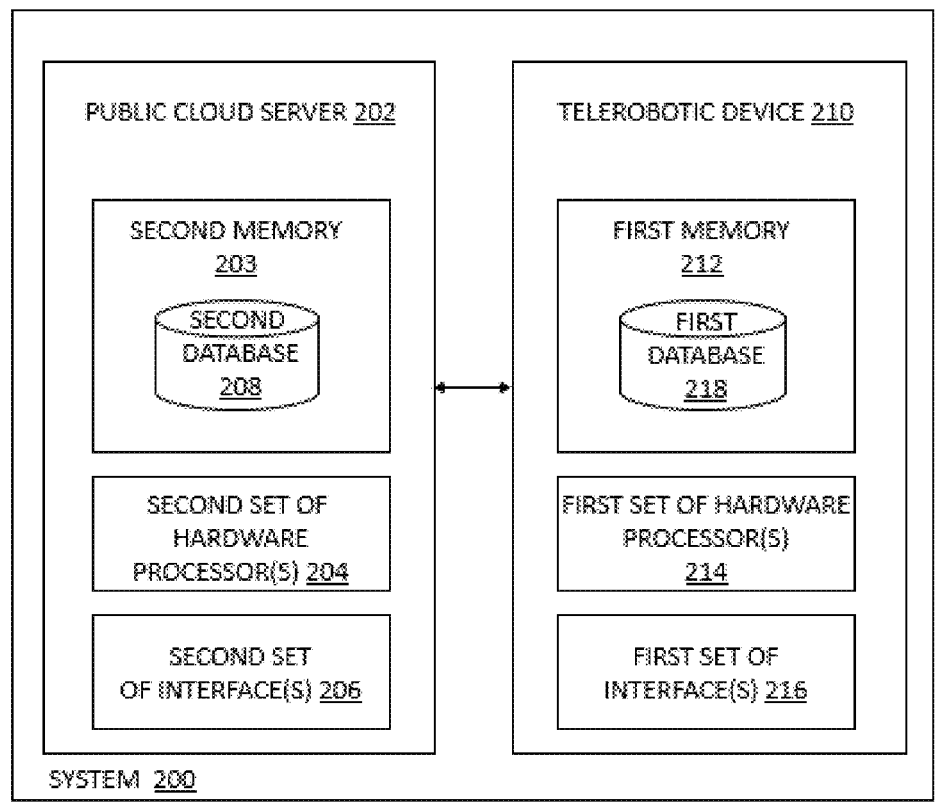
FIG. 2 illustrates an exemplary block diagram of a system for managing telerobotic session in an enterprise network, in accordance with an embodiment of the present disclosure.

FIG. 2 illustrates an exemplary block diagram of a system 200 for managing a telerobotic session in an enterprise network, such as the enterprise network 104, in accordance with an embodiment of the present disclosure. In some embodiments, the system 200 is embodied as a cloud-based and/or software as a service (SaaS) based architecture. In some embodiments, the system 200 may be implemented in a server system. In some embodiments, the system 200 may be implemented in a variety of computing systems, such as laptop computers, notebooks, hand-held devices, workstations, mainframe computers, servers, a network cloud and the like.

In an embodiment, the system 200 includes a public cloud server 202 (also referred as public cloud 106 in FIG. 1), and a telerobotic device 210 (also referred as the telerobotic device 102 in FIG. 1) that is communicatively coupled to the public cloud server 202 via an enterprise network (also referred as the enterprise network 104 in FIG. 1).

In at least one example embodiment, the telerobotic device 210 includes a first set of processors 214, a first set of communication interface device(s) or input/output (I/O) interface(s) 216, and one or more data storage devices or a first memory 212 operatively coupled to the first set of processors 214.

In at least one example embodiment, the public cloud server 202 includes a second set of processors 204, a second set of communication interface device(s) or input/output (I/O) interface(s) 206, and one or more data storage devices or second memory 203 operatively coupled to the second set of processors 204.

The first set of processors 214 and the second set of processors 204 may be one or more software processing modules and/or hardware processors. In an embodiment, the first set of processors 214 and the second set of processors 204 can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The I/O interface device(s) 206 and 216 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 203 and the memory 212 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 208 can be stored in the memory 203 and a database 218 can be stored in the memory 212. The memories 203 and 212 further comprise (or may further comprise) information pertaining to input(s)/output(s) of each step performed by the systems and methods of the present disclosure. In other words, input(s) fed at each step and output(s) generated at each step are comprised in the memories 203 and 212 and can be utilized in further processing and analysis.

It is noted that the system 200 as illustrated and hereinafter described is merely illustrative of a system that could benefit from embodiments of the present disclosure and, therefore, should not be taken to limit the scope of the present disclosure. It is noted that the system 200 may include fewer or more components than those depicted in FIG. 2.

Figure 3:
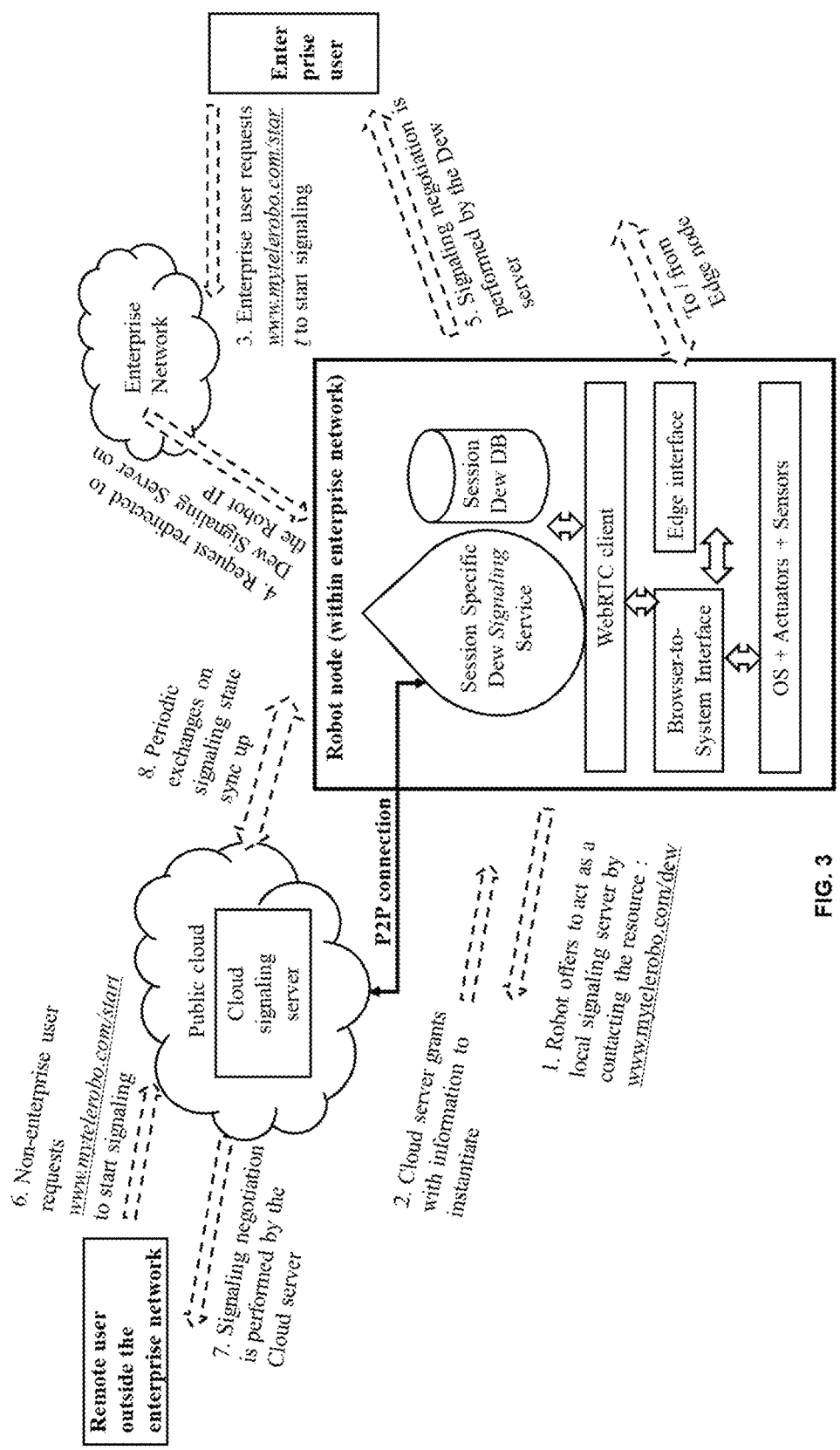
FIG. 3 illustrates a schematic block diagram representation of a telerobotic session managed by the system, in accordance with an embodiment of the present disclosure.

FIG. 3, with reference to FIGS. 1-2, illustrates a schematic block diagram representation 300 of a telerobotic session managed by the system 200 of FIG. 2, in accordance with an embodiment of the present disclosure.

As seen in FIG. 3, the public cloud server 202 present in the system 200 first receives a connection request from the telerobotic device 210 that is offering to act as a dew signaling server. Based on the request, the system 200 establishes a peer-to-peer connection (P2P) between a dew signaling server and a cloud signaling server present in the public cloud server 202. Then, using the P2P connection, the cloud signaling server sends information to the dew signaling server to instantiate the dew signaling server. In an embodiment, the information includes a script to instantiate a signaling logic into the dew signaling server, and session details. Thereafter, the system 200 receives one or more enterprise level signaling requests from one or more enterprise user devices (e.g., the enterprise user device 110) via an enterprise network proxy. The received enterprise level signaling requests are then redirected to the dew signaling server present on the telerobotic device 210 using the enterprise network proxy.

The dew signaling server then performs a signaling negotiation between the dew signaling server and the one or more enterprise user devices to establish a session between the dew signaling server and each enterprise user device of the one or more enterprise user devices. The established session is then used to handle requests from the one or more enterprise user devices.

Further, in case the system 200 receives one or more non-enterprise level signaling requests from one or more non-enterprise user devices (e.g., the non-enterprise user device 112) associated with one or more non-enterprise users, the public cloud server 202 performs the signaling negotiation between the cloud signaling server and the one or more non-enterprise user devices to handle one or more requests received from the one or more non-enterprise user devices.

Additionally, the system 200 performs synchronization between the dew signaling server and the cloud signaling server for performing synching of a signaling state of the dew signaling server and of the cloud signaling server after a predefined time period using the P2P connection.

Figure 4:
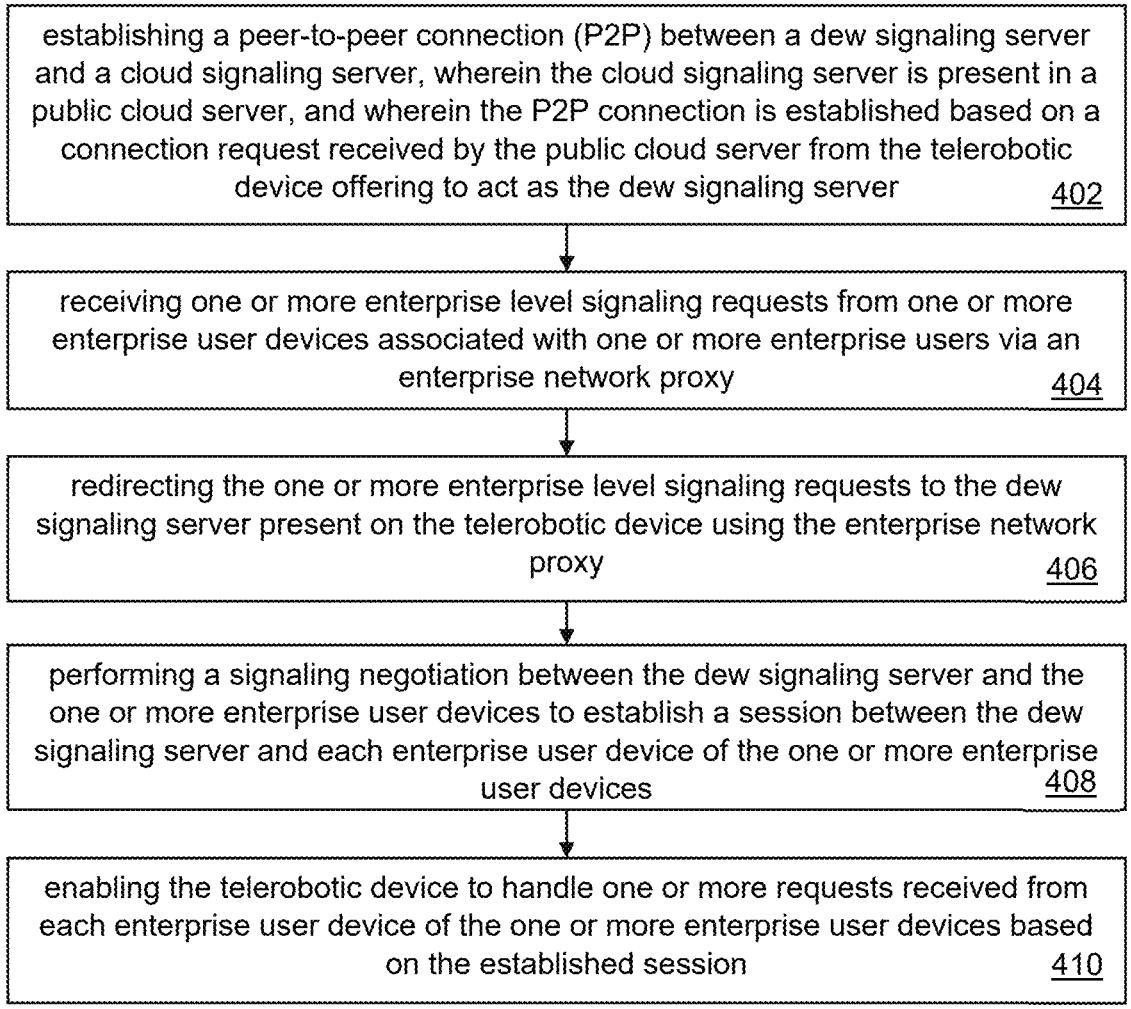
FIG. 4 illustrates an exemplary flow diagram of a method for managing telerobotic session in the enterprise network, in accordance with an embodiment of the present disclosure.

FIG. 4, with reference to FIGS. 1 through 3, represent an exemplary flow diagram of a method 400 for managing a telerobotic session in an enterprise network, in accordance with an embodiment of the present disclosure. The method 400 may use the system 200 of FIG. 2 for execution. In an embodiment, the system 200 comprises one or more data storage devices or the first memory 212 and the second memory 203 operatively coupled to the first set of hardware processors 214 and the second set of hardware processors 204, respectively. The first memory 212 and the second memory 203 is configured to store first and second set of instructions, respectively for execution of steps of the method 400 by the first set and the second set of hardware processors 214/204. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 200 as depicted in FIG. 2.

At step 402 of the method of the present disclosure, the first set of hardware processors 214 of the system 200 establishes a peer-to-peer connection (P2P) between the dew signaling server and the cloud signaling server. The P2P connection is established based on a connection request received by the public cloud server 202 from the telerobotic device 210 offering to act as the dew signaling server. The above step 402 is better understood by way of following description.

At the beginning of a telerobotic session, the first set of hardware processors 214 present in the telerobotic device 210 sends the connection request to the public cloud server 202 for making a connection i.e., the P2P connection with the cloud signaling server present in the public cloud server 202. The connection request also includes an offer to use available resources of the telerobotic device 210 to institute a dew service i.e., to use them for instituting the dew signaling server. In an exemplary scenario, the telerobotic device 210 may offer to act as the dew signaling server through a dedicated URL like 'https://www.mytelerobo-.com/dew', etc. So, this request triggers the establishment of the P2P connection, and the P2P connection is established between the dew signaling server present in the telerobotic device 210 and the cloud signaling server present in the public cloud server 202.

Once the P2P connection is established, the second set of hardware processors 204 of the public cloud server 202 sends information to the dew signaling server to instantiate the dew signaling server using the P2P connection. The information includes a script to instantiate a signaling logic into the dew signaling server, and session details of the telerobotic session. In an embodiment, the signaling logic may be the entire business logic present in the cloud signaling server.

At step 404 of the method of the present disclosure, the first set of hardware processors 204 of the system 200 receives one or more enterprise level signaling requests from one or more enterprise user devices (e.g., the enterprise user device 110) associated with one or more enterprise users via an enterprise network proxy. It should be noted that the signaling request is basically session establishment request exchanges that happen during the telerobotic session, and it may contain the signaling information. In an embodiment, the signaling information may include various session description details, such as encoding scheme, protocols used, user IDs, IP addresses, etc. The one or more enterprise user devices may send the signaling requests to an enterprise network (e.g., the enterprise network 104) for making a connection with the public cloud server 202 using the actual URL of the session i.e., 'https://www.mytelerobo.com/start'. But with the help of the enterprise network proxy, the telerobotic device 210 receives the signaling requests.

At step 406 of the method of the present disclosure, the first set of hardware processors 204 of the system 200 redirects the one or more enterprise level signaling requests to the dew signaling server present on the telerobotic device 210 using the enterprise network proxy. So, instead of hitting a uniform resource locator (URL) of the session i.e., 'https://www.mytelerobo.com/start', the enterprise user devices actually hit the URL of the telerobotic device 210 i.e., 'https://www.mytelerobo.com/dew' while remaining completely agnostic about the redirection of the URL.

The enterprise network 104, upon receiving the signaling requests, redirects them to the telerobotic device 210 using the enterprise network proxy and the telerobotic device 210 redirects them to the dew signaling server present on the telerobotic device 210.

At step 408 of the method of the present disclosure, the first set of hardware processors 204 of the system 200 performs a signaling negotiation i.e., negotiation of session parameters between the dew signaling server and the one or more enterprise user devices to establish a session between the dew signaling server and each enterprise user device of the one or more enterprise user devices.

At step 410 of the method of the present disclosure, the first set of hardware processors 204 of the system 200 enables the telerobotic device 210 to handle one or more requests received from each enterprise user device of the one or more enterprise user devices based on the established session. So, with the help of the established session, the enterprise user queries are handled at the telerobotic device 210 instead of going to the public cloud server 202. Thus, when the session is limited within the enterprise users only, the signaling bandwidth is not consumed from the public Internet infrastructure and the enterprise users still benefit from a localized service without undermining the global infrastructure.

Further, in case one or more non-enterprise users want to join the telerobotic session, the one or more non-enterprise users may send the signaling requests to the public cloud server 202 i.e., one or more non-enterprise user devices (e.g., the non-enterprise user device 112) may try to hit the same session URL i.e., 'https://www.mytelerobo.com/start'. The second set of hardware processors 204 present in the public cloud server 202 receives one or more non-enterprise level signaling requests from the one or more non-enterprise user devices associated with the one or more non-enterprise users. Upon receiving the signaling requests, the second set of hardware processors 204 performs the signaling negotiation between the cloud signaling server and the one or more non-enterprise user devices to handle one or more requests received from the one or more non-enterprise user devices.

Thereafter, the second set of hardware processors 204 establishes a session between the cloud signaling server and each non-enterprise user device of the one or more non-enterprise user devices to enable the cloud signaling server to handle one or more requests received from each non-enterprise user device of the one or more non-enterprise user devices. So, instead of hitting the same URL, the non-enterprise user devices are served by the cloud signaling server.

In an embodiment, the first set of hardware processors 214 present in the telerobotic device 210 may perform synchronization between the dew signaling server and the cloud signaling server for performing synching of a signaling state of the dew signaling server and of the cloud signaling server after a predefined time period using the P2P connection. In particular, periodic exchanges are performed between the dew signaling server and the cloud signaling server for synching the signaling state of the dew signaling server.

Figure 5:
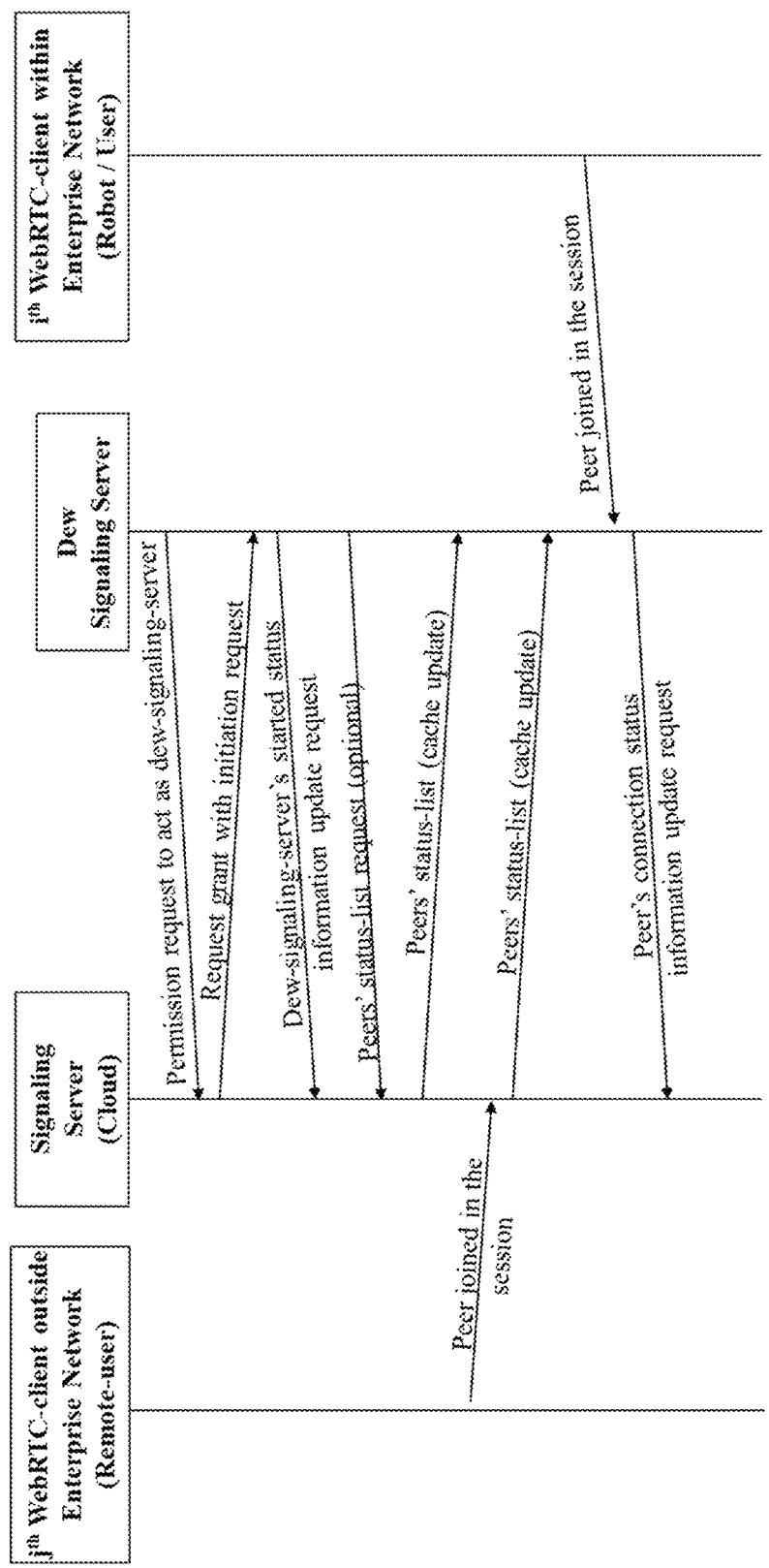
FIG. 5 illustrates a timing sequence diagram of a session establishment and message exchanges between a cloud signaling server residing on a public cloud sever and a dew signaling server residing on a telerobotic device, in accordance with an embodiment of the present disclosure.

FIG. 5, with reference to FIGS. 1 to 4, illustrates a timing sequence diagram of a session establishment and message exchanges between the cloud signaling server residing on the public cloud sever 202 and the dew signaling server residing on the telerobotic device 210, in accordance with an embodiment of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, the available techniques are either cloud-centric in which the cloud maintains the session with the robot for end users which sometimes cause increased latency due to internet uncertainty while significantly reducing desired quality of service, or edge-based systems in which an additional edge is added close to the robot/operator premise which increases the operation as well as the maintenance cost for the enterprises. So, to overcome the disadvantages, embodiments of the present disclosure provide a system and a method for managing a telerobotic session in an enterprise network using dew computing. More specifically, the system uses the dew signaling server present in the telerobotic device for handling requests received from enterprise user devices, thereby ensuring improved quality of experience for enterprise users as session establishment is very quick between the dew signaling server and the enterprise user devices. Further, when the session is limited only to enterprise users, the system does not consume bandwidth from the public Internet infrastructure as the requests are handled by the due signaling server residing in the telerobotic device, thereby ensuring reduces bandwidth consumption even when the signaling server resides in the cloud.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A system, further comprising:
   a public cloud server communicatively coupled to an enterprise network, the public cloud server further comprising a cloud signaling server; and
   a telerobotic device communicatively coupled to the public cloud server via the enterprise network, wherein the telerobotic device comprises:
      a first memory configured to store a first set of instructions; and
      a first set of hardware processors coupled to the first memory via a first set of communication interfaces,
      wherein the first set of hardware processors is configured by the first set of instructions to:
      establish a peer-to-peer connection (P2P connection) between a dew signaling server and the cloud signaling server, wherein the P2P connection is established based on a connection request received by the public cloud server from the telerobotic device offering to act as the dew signaling server, wherein the public cloud server comprises:
         a second memory configured to store a second set of instructions, and
         a second set of hardware processors coupled to the second memory via a second set of communication interfaces;
      receive one or more enterprise level signaling requests from one or more enterprise user devices associated with one or more enterprise users via an enterprise network proxy;
      redirect the one or more enterprise level signaling requests to the dew signaling server present on the telerobotic device using the enterprise network proxy;
      perform a signaling negotiation between the dew signaling server and the one or more enterprise user devices to establish a session between the dew signaling server and each enterprise user device of the one or more enterprise user devices; and
      enable the telerobotic device to handle one or more requests received from said each enterprise user device of the one or more enterprise user devices based on the established session.

2. The system of claim 1, comprises:
   wherein the second set of hardware processors is configured by the second set of instructions to:
      send information to the dew signaling server to instantiate the dew signaling server using the P2P connection, wherein the information comprises a script to instantiate a signaling logic into the dew signaling server, and session details.

3. The system of claim 1, wherein the second set of hardware processors is configured by the second set of instructions to:
   receive one or more non-enterprise level signaling requests from one or more non-enterprise user devices associated with one or more non-enterprise users;
   perform the signaling negotiation between the cloud signaling server and the one or more non-enterprise user devices to handle one or more requests received from the one or more non-enterprise user devices;
   establish a second session between the cloud signaling server and each non-enterprise user device of the one or more non-enterprise user devices; and
   enable the cloud signaling server to handle one or more requests received from each non-enterprise user device of the one or more non-enterprise user devices based on the established second session.

4. The system of claim 1, wherein the first set of hardware processors is configured by the first set of instructions to:
   perform synchronization between the dew signaling server and the cloud signaling server for performing synching of a signaling state of the dew signaling server and of the cloud signaling server after a predefined time period using the P2P connection.

5. A method, comprising:
establishing a peer-to-peer connection (P2P connection) between a dew signaling server and a cloud signaling server, wherein the cloud signaling server is present in a public cloud server, and wherein the P2P connection is established based on a connection request received by the public cloud server from a telerobotic device offering to act as the dew signaling server;
receiving one or more enterprise level signaling requests from one or more enterprise user devices associated with one or more enterprise users via an enterprise network proxy;
redirecting the one or more enterprise level signaling requests to the dew signaling server present on the telerobotic device using the enterprise network proxy;
performing a signaling negotiation between the dew signaling server and the one or more enterprise user devices to establish a session between the dew signaling server and each enterprise user device of the one or more enterprise user devices; and
enabling the telerobotic device to handle one or more requests received from said each enterprise user device of the one or more enterprise user devices based on the established session.

6. The method of claim 5, further comprising:
sending information to the dew signaling server to instantiate the dew signaling server using the P2P connection, wherein the information comprises a script to instantiate a signaling logic into the dew signaling server, and session details.

7. The method of claim 5, further comprising:
receiving one or more non-enterprise level signaling requests from one or more non-enterprise user devices associated with one or more non-enterprise users;
performing the signaling negotiation between the cloud signaling server and the one or more non-enterprise user devices to handle one or more requests received from the one or more non-enterprise user devices;
establishing a second session between the cloud signaling server and each non-enterprise user device of the one or more non-enterprise user devices; and
enabling the cloud signaling server to handle one or more requests received from each non-enterprise user device of the one or more non-enterprise user devices based on the established second session.

8. The method of claim 5, further comprising:
performing synchronization between the dew signaling server and the cloud signaling server for performing synching of a signaling state of the dew signaling server and of the cloud signaling server after a predefined time period using the P2P connection.

9. One or more non-transitory machine-readable information storage mediums comprising one or more instructions which when executed by one or more hardware processors cause:
establishing a peer-to-peer connection (P2P connection) between a dew signaling server and a cloud signaling server, wherein the cloud signaling server is present in a public cloud server, and wherein the P2P connection is established based on a connection request received by the public cloud server from a telerobotic device offering to act as the dew signaling server;
receiving one or more enterprise level signaling requests from one or more enterprise user devices associated with one or more enterprise users via an enterprise network proxy;
redirecting the one or more enterprise level signaling requests to the dew signaling server present on the telerobotic device using the enterprise network proxy;
performing a signaling negotiation between the dew signaling server and the one or more enterprise user devices to establish a session between the dew signaling server and each enterprise user device of the one or more enterprise user devices; and
enabling the telerobotic device to handle one or more requests received from said each enterprise user device of the one or more enterprise user devices based on the established session.

10. The one or more non-transitory machine-readable information storage mediums of claim 9, wherein the one or more instructions which when executed by the one or more hardware processors further cause:
sending information to the dew signaling server to instantiate the dew signaling server using the P2P connection, wherein the information comprises a script to instantiate a signaling logic into the dew signaling server, and session details.

11. The one or more non-transitory machine-readable information storage mediums of claim 9, wherein the one or more instructions which when executed by the one or more hardware processors further cause:
receiving one or more non-enterprise level signaling requests from one or more non-enterprise user devices associated with one or more non-enterprise users;
performing the signaling negotiation between the cloud signaling server and the one or more non-enterprise user devices to handle one or more requests received from the one or more non-enterprise user devices;
establishing a second session between the cloud signaling server and each non-enterprise user device of the one or more non-enterprise user devices; and
enabling the cloud signaling server to handle one or more requests received from each non-enterprise user device of the one or more non-enterprise user devices based on the established second session.

12. The one or more non-transitory machine-readable information storage mediums of claim 9, wherein the one or more instructions which when executed by the one or more hardware processors further cause:
performing synchronization between the dew signaling server and the cloud signaling server for performing synching of a signaling state of the dew signaling server and of the cloud signaling server after a predefined time period using the P2P connection.

* * * * *